United States Patent [19]
Hadley et al.

[11] 3,727,617
[45] Apr. 17, 1973

[54] CORN HARVESTER

[75] Inventors: Howard C. Hadley, Dallas Center; Glenn Dale Head, Des Moines, both of Iowa

[73] Assignee: Deere & Company, Moline, Ill.

[22] Filed: May 25, 1971

[21] Appl. No.: 146,714

[52] U.S. Cl. .................................. 130/5 B, 56/66
[51] Int. Cl. ............................................ A01f 11/06
[58] Field of Search ................. 130/5 R, 5 B, 5 G, 130/5 H; 56/16.5, 103, 104, 105, 106, 66

[56] References Cited

UNITED STATES PATENTS

| | | | |
|---|---|---|---|
| 2,492,897 | 12/1949 | Siefken | 130/5 B |
| 2,822,811 | 2/1958 | Slavens et al. | 130/5 B |
| 2,491,195 | 12/1949 | Messenger et al. | 56/66 |

*Primary Examiner*—Antonio F. Guida
*Attorney*—H. Vincent Harsha, Harold M. Knoth, William A. Murray, John M. Nolan, Raymond L. Hollister, Jimmey R. Oaks and John O. Hayes

[57] ABSTRACT

A corn husker of the pull-type composed of a transverse housing structure with the husking bed disposed transversely within the housing, an inlet elevator on one side of the housing that drops the ears of corn onto the upper end of the husking bed and a discharge elevator on the opposite side of the housing that receives the treated corn from the husking bed. A blower is provided as a suitable duct work extending to a pair of outlets, one of which is on the inlet elevator side of the housing and which directs a stream of air through the corn leaving the elevator and gravitating to the husking bed, and the second discharge outlet that is on the opposite side of the housing structure and is directed transversely to pass over the corn laying on the husking bed.

6 Claims, 7 Drawing Figures

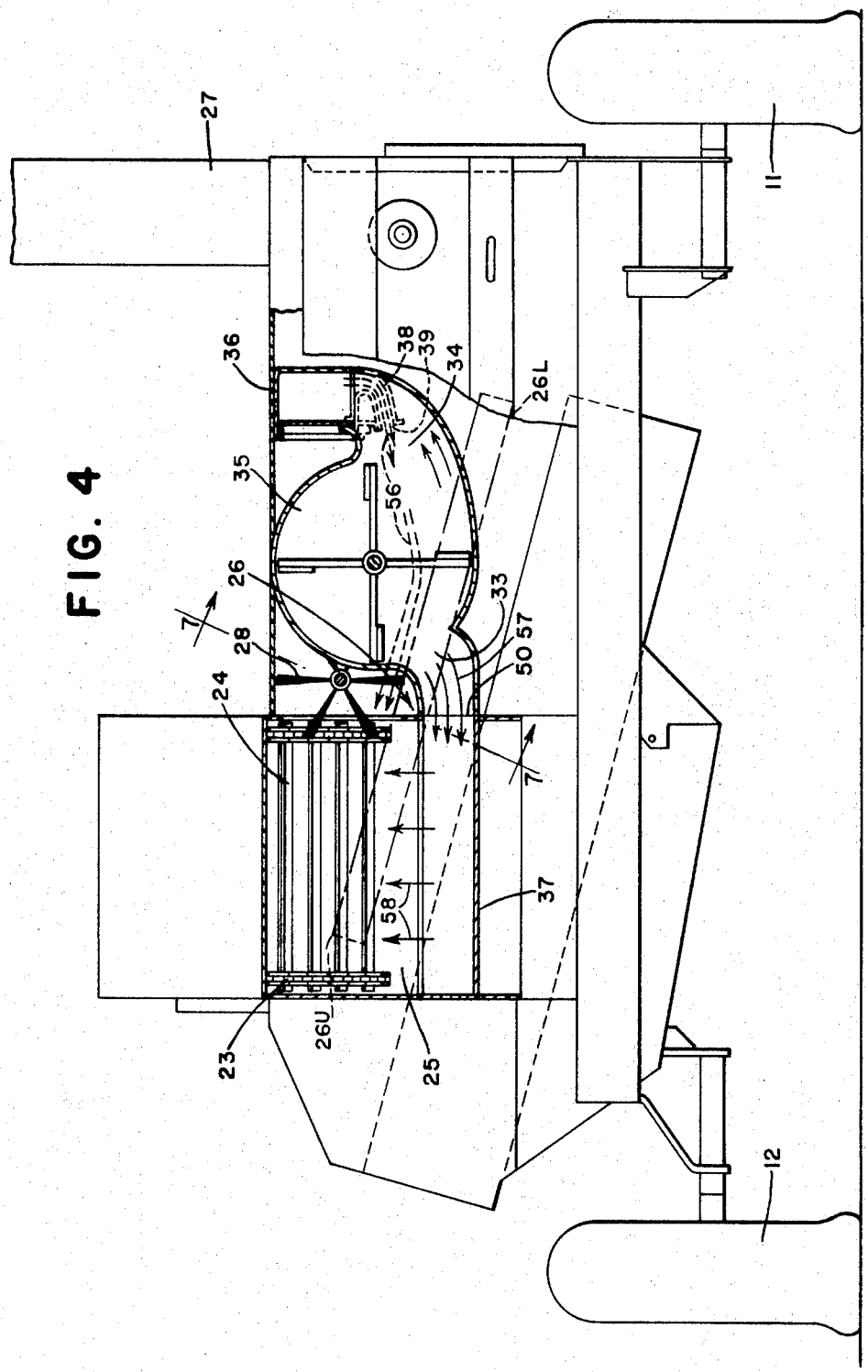

CORN HARVESTER

BACKGROUND OF THE INVENTION

It has heretofore been known to provide a pull-type corn picker and husker. However, the pull-type husker has not become popular for several reasons, one of which is its inability to de-husk and move a large amount of corn through the unit. It has also been known to provide blower means for husking units that aids in removing the husks and other trash from the ears of corn as they move over the husking bed.

With the use of new and large corn heads, there is an increased capacity to pick corn and when fed into the husking unit, the husking unit must have increased capacity to handle the corn. Therefore, the use of air properly within the husking unit becomes of primary importance.

SUMMARY OF THE INVENTION

With the above in mind, it is the primary object of the present invention to provide a pull-type corn husker that utilizes air to a greater extent than was known in previous huskers to remove trash, husks and other foreign material from the corn as it moves through the husker.

More specifically, it is proposed to provide a corn husker in which the husking bed is laid transversely across the housing structure and extends from an upper inlet end to a lower discharge end. Ears of corn are elevated to the inlet end of the husking bed and pass onto the husking bed through a downwardly directed stream extending from the upper end of the elevator to the upper end of the husking bed. A single blower is utilized and has a pair of blower discharge outlets leading to a pair of air discharge manifolds, one of which extends fore-and-aft and directs air transversely over the husking bed, and the other of which extends transversely and directs a stream of air rearwardly through the corn as it moves from the elevator to the upper end of the husking bed.

BRIEF DESCRIPTION OF THE DRAWINGS

FIG. 4 is a front view with portions broken away and as taken substantially along the line 4—4 of FIG. 3.

DESCRIPTION OF THE PREFERRED EMBODIMENT

Figure 1:
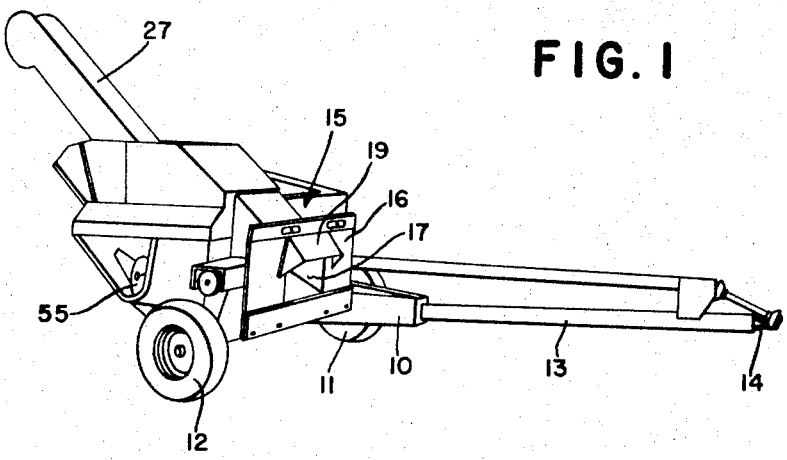
FIG. 1 is a front and right side perspective view of the crop-treating unit without the forward crop harvesting mechanism attached.
Figure 2:
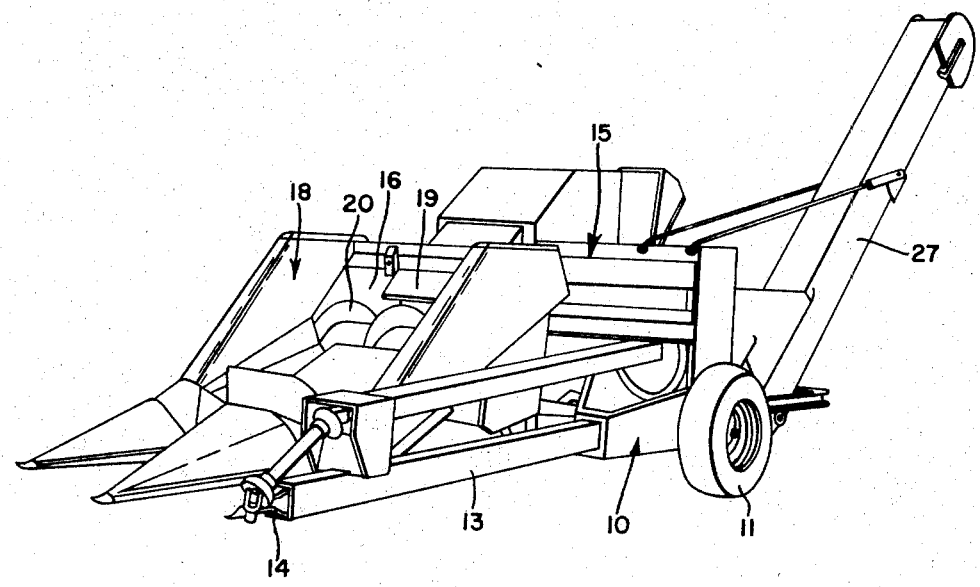
FIG. 2 is a front and left side perspective view of the crop-treating unit with the crop harvesting attachment mounted thereon.
Figure 5:
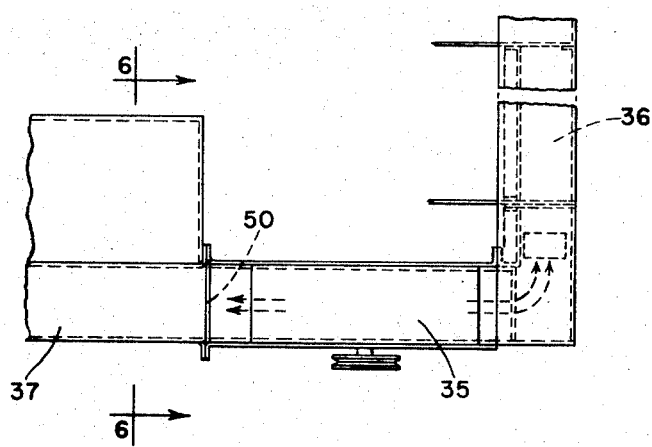
FIG. 5 is a plan view of the blower mechanism including the duct work and outlet structure of the air system.

The corn treating unit is of a corn-husking variety having a main frame 10 supported on left- and right-hand transport wheels 11, 12 and having a forwardly directed rigid tongue 13 with a hitch connection 14 at its forward end for connection to and support on a tractor drawbar. The husking unit includes a transverse housing structure 15 that extends from a first or right side adjacent the wheel 12 transversely to a second or left side adjacent the wheel 11. The housing 15 has a forward upright plate structure 16 with a crop inlet 17. The plate structure 16 fits into and receives the rear side of a corn harvesting unit indicated in its entirety by the reference numeral 18. A hood 19 extends forwardly from the plate structure 16 and lays over a transverse auger 20, when the harvesting unit 18 is attached, and aids in the movement of corn through the inlet 17. Extending rearwardly from the inlet 17 is an undershot-type elevator 23 of a raddle-type having flights 24 extending between transversely spaced chains. The underside of the elevator moves upwardly and rearwardly over a floor panel 25. The upper end of the elevator discharges onto the upper end of a husking bed 26. The husking bed is of a conventional nature, made up of a series of pairs of parallel husking rolls having adjacent sides moving downwardly, and operates to strip husks from the ears of corn as the ears move along the husking bed. The husking bed 26 has its upper end 26U adjacent the first side and extending therefrom to a lower end 26L adjacent the second side of the husking unit where it discharges the husked ears of corn into a discharge elevator 27. Positioned above the husking bed 26 are brush wheels 28 which aid in pushing the ears against the husking rolls as well as moving the ears downwardly.

As may be seen from viewing FIG. 4, the elevator 23 is positioned on the first or right-hand side of the implement and the elevator 27 is positioned on the second or left-hand side of the implement. The husking bed 26 is in a transverse disposition having its upper intake end 26U on the first side and its lower discharge end 26L on the second side.

The blower system also extends transversely substantially the full width of the husking unit and includes a blower 35 having outlets 33, 34 that discharges air to a pair of discharge manifolds 36, 37. The discharge manifold 36 extends fore-and-aft and has a lower discharge spout 38 depending from the underside thereof and extending to a discharge outlet 39. Air is blown through the outlet 39 onto the upper side of the husking bed 26. The discharge manifold 37 extends transversely to and discharges air upwardly and rearwardly through suitable duct work having a discharge outlet 40. The air leaving the outlet 40 is blown through the corn ears passing from the upper end of the elevator 23 onto the upper end of the husking bed 26. The discharge spout leading to the outlet 40 is formed in part by the floor 25 of the elevator, a laterally disposed panel 42 that is spaced beneath and which is parallel to the floor 25, and side walls, an outer one having the reference number 43 and the inner one having the reference number 44. The walls 43, 44 form the vertical sides for the elevator housing. Suitable flanges are provided on the panels 42 and 25 for bolting the respective panels to the side walls 43, 44. The manifold 37 is composed of front and rear vertical walls 45, 46, the latter being integral with the lower end of the panel 42, which are interconnected by a lower horizontal panel 47. Air enters the manifold 37 in the direction of arrows 57 through an opening 50 in the side wall 44. Again, the panels 45, 46 and 47 have flanges at their edges for riveting to the side walls 43, 44. The blower 35 and the manifold 37 are disposed forwardly of the husking bed. The blower 35 blows directly into the manifold 36 and into the manifold 37 respectively through outlets 34, 33. From the manifold 37 the air moves upwardly and rearwardly as indicated by arrows 58 to the outlet 40.

Figure 3:
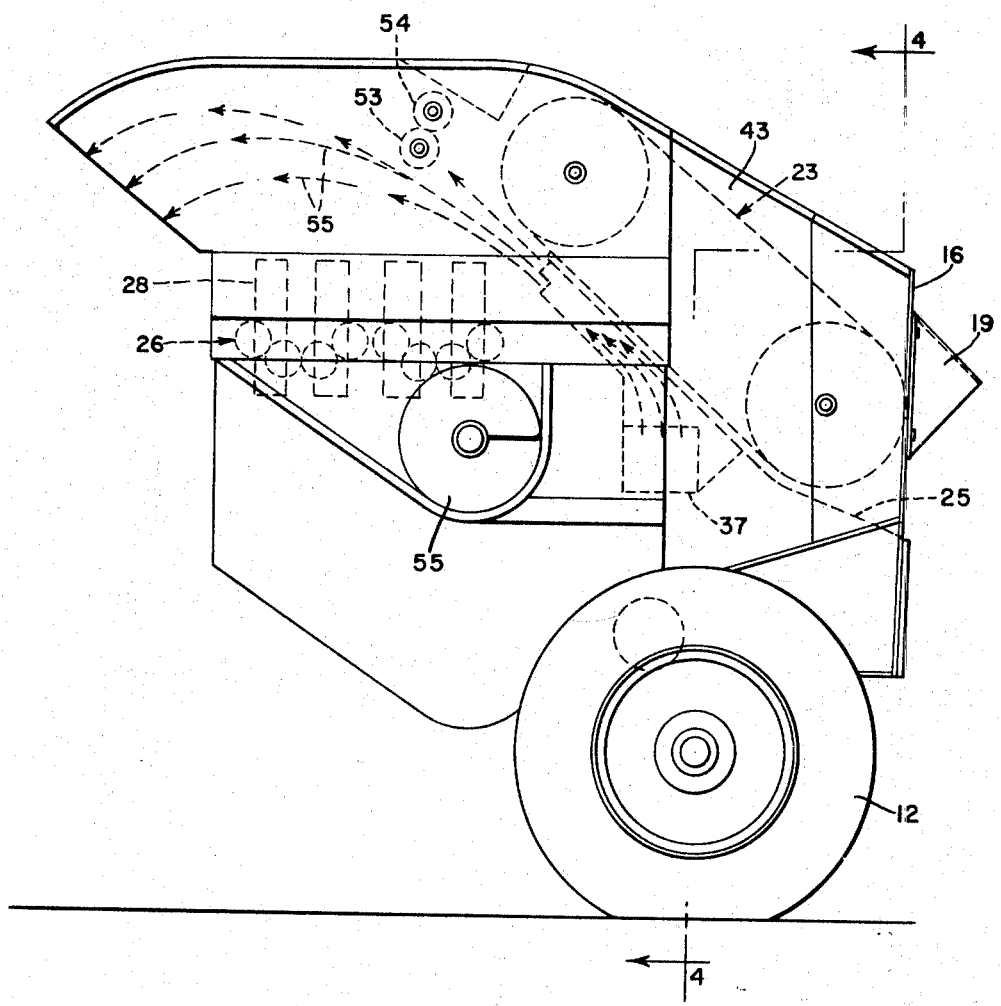
FIG. 3 is a right side and end view of the crop-treating unit.
Figure 6:
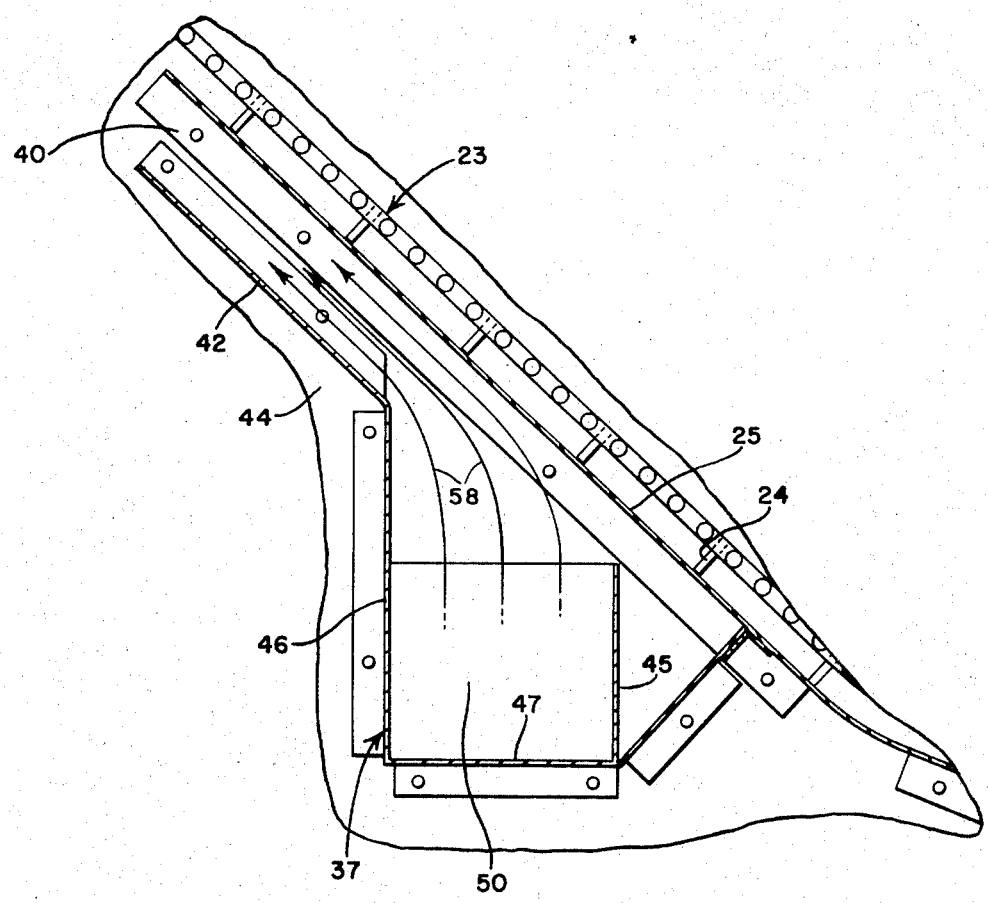
FIG. 6 is an enlarged sectional view taken along the line 6—6 of FIG. 5.
Figure 7:
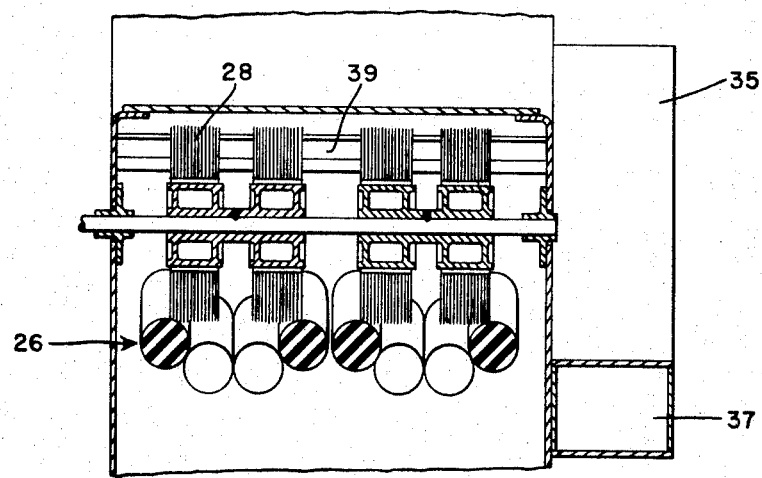
FIG. 7 is an enlarged sectional view taken along the line 7—7 of FIG. 4.

When in operation, the harvester is normally moved forwardly and unhusked ears of corn are removed from stalks and moved rearwardly into the husking unit. By the nature of the corn harvester 18, there will be some stalks moved with the corn. The elevator 23 moves the stalks, husks and ears rearwardly over the panel 25 to its upper end adjacent the blower discharge outlet 40 and the material gravitates onto the upper end of the husking rolls. To aid in removing the stalks and trash, an additional pair of rolls 53, 54 are provided adjacent the upper end of the elevator to grasp and pull the stalks through the unit. The air leaving the outlet 40, as indicated by the reference numeral 55, passes under this trash and suspends some trash such as stalks until it reaches the rolls 53, 54. Often an ear will not be detached from its stalk through the normal harvesting operation. The air stream will blow the stalk into the rolls where they will detach the ear. Also, the stream of air blown from the outlet 40 drives loose stalks, husks and other foreign material from the corn as it passes in a stream between the upper end of the elevator 23 and the husking bed. Such trash, stalks and foreign material flow out of the entire unit through a rear open side, the paths of their movement being shown in dotted representation in FIG. 3. The ears of corn with their remaining husks attached are then moved downwardly by the wheels 28, 29 over the husking rolls of the husking bed 26. Husks are here removed in a conventional manner by the husking rolls and are discharged downwardly into a side discharge auger, parts of which may be seen at 55. Ears of corn are discharged from the lower end of the husking bed 26 into a trough for the discharge elevator 27. When the ears of corn are positioned on the bed 26, a stream of air passing through the outlet 39 in the direction of the arrows 56 helps in removing the husks and also in removing trash and other foreign material from the bed of the husking unit 26.

We claim:

1. In a mobile corn-treating unit having a frame including a draft tongue for driving the unit over a field and first and second sides spaced apart transversely with respect to the direction of travel; a housing supported on and extending transversely across the frame; a husking bed supported within the housing and having inclined husking rolls extending transversely and having upper ends on the first side and continuing downwardly to lower ends at the second side; an inlet elevator on the first side receiving and raising corn for gravitational discharge in a downwardly directed stream onto the upper ends of the husking rolls; a discharge elevator on the second side directed rearwardly and having a lower end receiving corn from the lower ends of the husking rolls and dispatching it rearwardly; and a blower including duct structure leading to a pair of outlets, one outlet being adjacent the second side and extending fore-and-aft above the husking bed for directing a stream of air transversely onto the bed, and the other outlet being adjacent the first side extending transversely and directing a stream of air rearwardly through the stream of material falling from the upper end of the inlet elevator onto the husking bed.

2. The corn-treating unit as set forth in claim 1 characterized by the blower being centrally located between the sides, the husking bed and the blower are in fore-and-aft offset relation to one another, and the blower has a housing with a pair of outlets opening to transverse opposite sides thereof and the latter are in communication with duct structure leading to the aforesaid pair of outlets adjacent the second side and adjacent the first side.

3. The corn-treating unit as set forth in claim 1 in which the inlet elevator is an undershot elevator and the floor of the elevator terminates at the outlet and serves as an upper panel of the duct structure leading to the outlet, and its edge defines part of the outlet.

4. The corn-treating unit as set forth in claim 1 in which the duct structure includes a pair of air manifolds adjacent to the respective outlets for retaining a substantial continuous and even flow of air through the outlet.

5. In a mobile corn-treating unit having a mobile frame with first and second sides spaced apart transversely with respect to the direction of travel; a housing supported on and extending transversely across the frame; a husking bed supported within the housing and including inclined husking rolls extending transversely and having upper ends on the first side and lower ends at the second side; an inlet elevator on the first side receiving and raising corn for gravitational discharge in a downwardly directed stream onto the upper ends of the husking rolls; a discharge elevator on the second side directed rearwardly and having a lower end receiving corn from the lower ends of the husking rolls and dispatching it rearwardly; and a blower including duct structure passing air to a pair of outlets, one adjacent the second side for directing a stream of air onto the bed, and the other adjacent the first side directing a stream of air through the stream of material falling from the upper end of the inlet elevator onto the husking bed.

6. The invention defined in claim 5 further characterized by a pair of cooperating rolls adjacent to but spaced from the upper end of the inlet elevator for receiving stalks carried by the elevator, and in which the said outlet adjacent the first side suspends and drives the stalks to the cooperating rolls.

* * * * *